United States Patent Office 3,541,085
Patented Nov. 17, 1970

3,541,085
METHOD OF PREPARING THIOTRICYCLIC COMPOUNDS
Richard Moats Sheeley, Shippensburg, Pa., and George Rodger Allen, Jr., Old Tappan, N.J., assignors to American Cyanamid Company, Stamford, Conn., a corporation of Maine
No Drawing. Continuation-in-part of application Ser. No. 602,147, Dec. 16, 1966. This application May 9, 1969, Ser. No. 823,510
Int. Cl. C07d 53/00, 93/42, 87/54
U.S. Cl. 260—239.3                10 Claims

ABSTRACT OF THE DISCLOSURE

This invention describes the preparation of oxazepines, thiazepines, diazepines and azepines. These compounds are prepared by condensing intermediates such as substituted thiocarbanilates or thioureas with an excess of polyphosphoric acid to produce dibenz heterocyclicthiones. The present compounds are intermediates for preparing compounds having physiological activity at the central nervous system.

This application is a continuation-in-part of application Ser. No. 602,147, filed Dec. 16, 1966, now abandoned. Starting materals used in this application are described and claimed in application Ser. No. 602,149, also filed Dec. 16, 1966, now abandoned.

DESCRIPTION OF THE INVENTION

The compounds prepared by the novel process of this invention may be represented by the following formula:

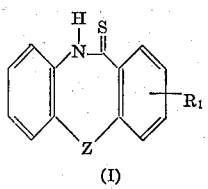

(I)

wherein $R_1$ is selected from the group consisting of hydrogen, and halogen, and Z is selected from the group consisting of oxygen, sulfur, methylene and $>$N-lower alkyl.

The compounds prepared by the process of this invention are, in general, yellow crystalline solids only slightly soluble in water, but moderately soluble in organic solvents such as methanol, ethanol and the like.

The process of this invention consists of heating an aryl thiocarbanilate (IV) or thiourea (IV) with polyphosphoric acid as illustrated in the following reaction scheme:

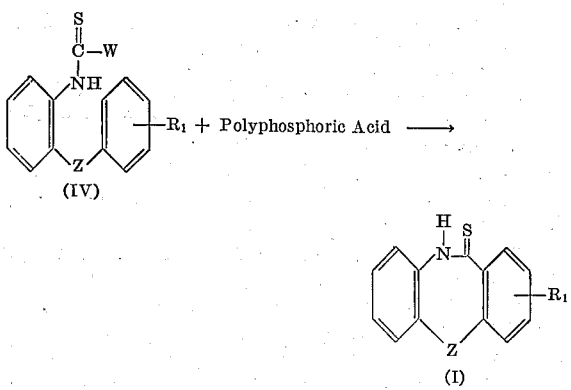

wherein $R_1$ and Z are as described hereinbefore and W is selected from the group consisting of mononuclear aryloxy, di-lower alkyl amino, N-lower alkylpiperazino, N-(ω-hydroxy lower alkyl)piperazino, N-[(ω-dilower alkylamino)lower alkyl]piperazino, morpholino, cyclopolymethyleneimino of from 4 to 6 carbon atoms.

The reaction is usually performed using an excess of polyphosphoric acid at a temperature of about 70–200° C. for approximately 15 minutes to 24 hours. The preferred temperature is from 100–150° C. When the desired cyclization has been achieved, the products (I) are generally obtained by addition of the reaction solution to water. The products (I) may be isolated by filtration or extraction with an organic solvent, such as diethyl ether, methylene chloride, and the like.

The compounds prepared by the novel process of this invention are useful as intermediates for the preparation of 11 - substituted aminodibenz[b,f][1,4]oxazepines, 11-substituted aminodibenz[b,f][1,4]thiazepines, 11 - substituted aminodibenz[b,f][1,4]diazepines and 6-substituted aminomorphanthridines. Thus, in accord with the following reaction scheme, treatment of the compounds (I), prepared by the process of this invention, with an amine gives the 11-substituted aminodibenz[b,f][1,4]oxazepines, 11-substituted aminodibenz[b,f][1,4]thiazepines, 11 - substituted aminodibenz[b,f][1,4]diazepines or 6-substituted aminomorphanthridines (II). Alternatively, for the conversion of (I) into (II) the former compounds may be treated with an alkyl halide, aralkyl halide, alkyl sulfonate ester or aralkyl sulfonate ester to give S-alkyl and S-aralkyl derivatives (III). Treatment of compounds (III) with an amine produces the substituted amino derivatives (II) as shown below:

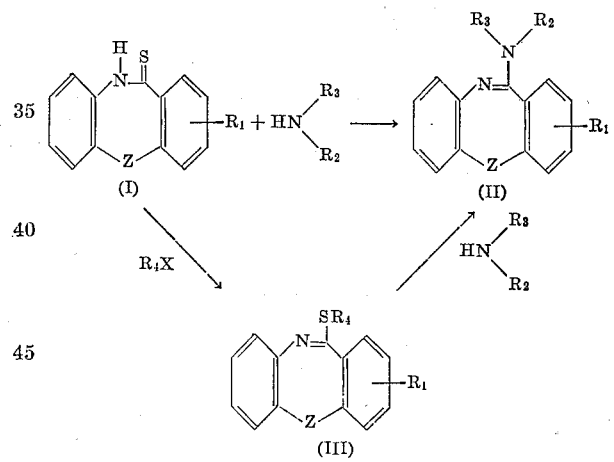

wherein $R_1$ and Z are as described hereinbefore and $R_2$ and $R_3$ are members of the group consisting of hydrogen, alkyl, alkenyl, aryl, (di-lower alkylamino)alkyl, hydroxyalkyl, and $$-N\begin{matrix}R_2\\\\R_3\end{matrix}$$

taken together are piperazino, N-lower alkyl piperazino, N-(ω-hydroxy lower alkyl)piperazino, N-[(ω - di - lower alkylamino)alkyl]piperazino, morpholino, and cyclopolymethyleneimino of from 4 to 6 carbon atoms, and $R_4$ is lower alkyl or phenyl lower alkyl.

The substituted amino derivatives (II) are physiologically active on the central nervous system. They show high activity as tranquilizers at non-toxic doses, and in some instances anti-depressant properties at dosage levels which produce neither overt stimulation nor depression.

A useful test for tranquilizer activity consists of measuring the reduction of spontaneous motor activity in animals by means of an actophotometer (a photoelectric device for quantitatively measuring locomotor activity). Graded doses of the active compounds (II) are administered to groups of mice, and the effective dosage range for a significant reduction of motor activity (a measure of tranquilization) compared to control groups is established. The use of reduced motor activity as a measure of tranquilizing activity has been described by W. D. Gray, A. C. Osterberg and C. E. Rauh, Archives Internationales et de Therapie, vol. 134, p. 198 (1961) and by W. J. Kinnard and C. J. Carr, Journal of Pharmacology and Experimental Therapeutics, vol. 121, p. 354 (1957).

The anti-depressant properties of the compounds (II) are evident by measuring their ability to counteract a depression induced in animals by the administration of tetrabenazine hexamate. Graded doses of the active compounds (II) are administered to groups of mice, and this is followed by administering a dose of tetrabenazine which is known to markedly depress the exploratory behavior of normal mice. The anti-depressant treated groups show normal exploratory behavior, while the control groups, and groups treated with an ineffective anti-depressant agent, do not show this normal exploratory behavior, but show the well known profound depression induced by tetrabenazine.

The results from several dose levels are used to establish effective dose ranges. The anti-depressant compounds (II) show their desirable properties by this procedure at dose levels which produce little or no untoward reactions such as ataxia or reduced spontaneous motor activity.

In addition, some of the compounds (II) show other valuable pharmaceutical properties such as analgesic activity.

The following examples describe in greater detail the process of this invention.

EXAMPLE 1

Preparation of 5,6-dihydromorphanthridine-6-thione

A solution of 2.03 g. of phenoxythiocarbonyl chloride in 10 ml. of ether is added dropwise to a stirred solution of 4.32 g. of 2-aminodiphenylmethane in 90 ml. of ether; the resulting mixture is stirred at room temperature for 3 hours and then filtered. The ethereal filtrate is evaporated, and the residue is recrystallized from methanol to give 3.20 g. of phenyl 2-benzylthiocarbanilate as crystals, melting point 101°–102° C.

A solution of 4.24 g. of phenyl 2-benzylthiocarbanilate, prepared as described above, in 25 ml. of propyl alcohol is treated with 4.25 g. of N-methylpiperazine in 7 ml. of propyl alcohol. The solution is heated at reflux temperature for 30 minutes and poured into cold water. Filtration affords 2'-benzyl-4-methyl-1-piperazinethiocarboxanilide, which is recrystallized from ethyl acetate to give white crystals, melting point 134°–138° C.

2'-benzyl-4-methyl-1-piperazinethiocarboxanilide (500 mg.) is heated in polyphosphoric acid (about 15 ml.) for 15 minutes at 125–135° C., whereafter the mixture is poured into ice-water and stirred until the polyphosphoric acid is dissolved. The solution is extracted three times with ether, and the extracts dried over potassium carbonate and evaporated to give a residue that crystallizes upon trituration with ether. Recrystallization from methanol and then from ethyl acetate gives 5,6-dihydromorphanthridine-6-thione as yellow needles, melting point 221–233° C.

EXAMPLE 2

Preparation of 10,11-dihydrodibenz [b,f] [1,4] oxazepine-11-thione 2-aminodiphenyl ether hydrochloride (16.66 g., 0.075 mole) is converted into the free base by shaking with dilute ammonium hydroxide. The liberated base is extracted into ether, and the ethereal solution is dried over sodium sulfate. This solution is treated with a solution of 6.45 g. (0.0375 mole) of phenoxythiocarbonyl chloride in ether. The resulting solution is magnetically stirred at ambient temperature for about 21 hours; filtration gives white crystals of 2-aminodiphenyl ether hydrochloride. The solvent is removed from the filtrate to give an amber oil that crystallizes from hexane to give 12.4 g. of phenyl o-phenoxythiocarbanilate as crystals, melting point 95–98°.

Treatment of phenyl o-phenoxythiocarbanilate (prepared above) with a molar equivalent of 1-methylpiperazine gives the product, 4-methyl-2'-phenoxy-1-piperazinethiocarboxanilide, which forms white crystals, melting point 139–142° C., from dilute ethanol.

In the manner described in Example 1, treatment of 4-methyl-2'-phenoxy-1 - piperazinethiocarboxanilide (prepared above) with polyphosphoric acid at 110–120° C. for 1.5 hours gives the product 10,11-dihydrodibenz[b,f] [1,4]oxazepine-11 thione, melting point 196–197° C., after recrystallization from ether.

EXAMPLE 3

Preparation of 2-chloro-10,11-diphydrodibenz [b,f] [1,4]thiazepine-11-thione

In the manner described in Example 2, treatment of 2-amino-4'-chlorodiphenyl sulfide with phenoxythiocarbonyl chloride is productive of phenyl 2-(p-chlorophenylthio) thiocarbanilate, which is obtained as white crystals, melting point 114–115° C. Treatment of phenyl 2-(p-chlorophenylthio)thiocarbanilate, prepared above, with 1-methylpiperazine gives 2'-(p-chlorophenylthio)-4-methyl-1-piperazinethiocarboxanilide as an oil. This product is dissolved in methanol and treated with concentrated hydrochloric acid. Addition of ether causes precipitation of the 2'-(p-chlorophenylthio) - 4-methyl-1 - piperazinethiocarboxanilide hydrochloride as white crystals, melting point 196–197° C.

In the manner described in Example 1, treatment of 2'-(p-chlorophenylthio)-4-methyl-1 - piperazinethiocarboxanilide hydrochloride with polyphosphoric acid at 115–130° C. for about 1 hour gives the product 2-chloro-10,11-dihydrodibenz[b,f] [1,4]thiazepine - 11 - thione, melting point 264–265° C., after recrystallization from ether.

EXAMPLE 4

Preparation of 5,6-dihydromorphanthridine-6-thione

In the manner described in Example 1, treatment of phenyl 2-benzylthiocarbanilate with polyphosphoric acid at 100° C. for one hour gives the product as yellow needles, melting point 220–223° C.

EXAMPLE 5

Preparation of 10,11 - dihydrodibenz[b,f] [1,4]oxazepine-11-thione

Treatment of phenyl o-phenoxythiocarbanilate with piperidine in refluxing propanol for 40 minutes gives the product, 2'-phenoxy - 1 - piperidinethiocarboxanilide as white needles, melting point 135–136° C., after recrystallization from dilute ethanol.

In the manner described in Example 1, treatment of 2'-phenoxy - 1 - piperidinethiocarboxanilide with polyphosphoric acid at 115–130° C. for 1 hour gives the product 10,11-dihydrodibenz[b,f] [1,4]oxazepine-11-thione as yellow crystals, melting point 195–197° C.

EXAMPLE 6

Preparation of 10,11-dihydrodibenz[b,f] [1,4]thiazepine-11-thione

Treatment of an ethereal solution of 2-aminodiphenyl sulfide with phenoxythiocarbonyl chloride furnishes phenyl 2-(phenylthio)thiocarbanilate as white crystals, melting point 86–88° C., after recrystallization from ethanol. When phenyl 2-(phenylthio)thiocarbanilate is reacted with diethylamine in propanol, there is obtained crystals of 1,1 - diethyl-3-(2-phenylthio)phenyl thiourea, melting point 96–98° C., after recrystallization from methanol.

By the procedure of Example 1, treatment of 1,1-diethyl - 3 - (p-phenylthio)phenylthiourea with polyphosphoric acid at 100–115° C. produces 10,11 - dihydrodibenz[b,f][1,4]thiazepine-11-thione.

EXAMPLE 7

Preparation of 2 - chloro-10,11-dihydrodibenz[b,f][1,4] oxazepine-11-thione

In the manner described in Example 2, treatment of 2-amino-4'-chlorodiphenyl ether with phenoxy thiocarbonyl chloride gives phenyl 2-(p-chlorophenoxy)thiocarbanilate as an amber oil. This oil crystallizes after prolonged trituration with water. Recrystallization from heptane furnishes a white solid, melting point 69.5–71.0° C. Treatment of phenyl 2-(p-chlorophenoxy)thiocarbanilate with morpholine in refluxing propanol for one hour gives 2'-(p-chlorophenoxy) - 4 - morpholinethiocarboxanilide, white needles, melting point 145–147° C.

In the manner described in Example 1, treatment of 2'-(p-chlorophenoxy) - 4 - morpholinethiocarboxanilide with polyphosphoric acid at 100–120° C. gives the product 2-chloro - 10,11 - dihydrodibenz[b,f][1,4]oxazepine-11-thione as yellow needles, melting point 211–215° C.

EXAMPLE 8

Preparation of 10,11-dihydro-5-methyldibenz[b,f][1,4]diazepine-11-thione

Treatment of an ethereal solution of 2 - amino-N-methyldiphenylamine with phenoxythiocarbonyl chloride furnishes phenyl 2 - (N - methylanilino)thiocarbanilate, which is obtained as an oil. When phenyl 2-(N-methylanilino)thiocarbanilate, prepared above, is treated with 1-methylpiperazine, crystals of 4 - methyl-2'-(N-methylanilino) - 1 - piperazinethiocarboxanilide, melting point 131–132° C., result.

In the manner described in Example 1, treatment of 4-methyl - 2' - (N-methylanilino)-1-piperazinethiocarboxanilide with polyphosphoric acid gives the product 10,11-dihydro-5-methyldibenz[b,f][1,4]diazepine-11-thione.

EXAMPLE 9

Preparation of 2-chloro-10,11 - dihydrodibenz[b,f][1,4] oxazepine-11-thione

Treatment of phenyl 2 - (p-chlorophenoxy)thiocarbanilate with 1-(β-hydroxyethyl)piperazine in propanol for 30 minutes gives the product 2'-(p-chlorophenoxy)-4-(2'-hydroxyethyl)-1-piperazinethiocarboxanilide, as white crystals, melting point 155–158° C., after recrystallization from ethyl acetate.

In the manner described in Example 1, treatment of 2'-(p-chlorophenoxy)-4-(β - hydroxyethyl)-1-piperazinethiocarboxanilide with polyphosphoric acid at 115–130° C. for 2 hours gives the product 2-chloro-10,11-dihydrodibenz[b,f][1,4]oxazepine - 11 - thione, melting point 210–215° C.

EXAMPLE 10

Preparation of 2 - chloro-10,11-dihydrodibenz[b,f][1,4] oxazepine-11-thione

Reaction of phenyl 2-(p-chlorophenoxy)thiocarbanilate with 1 - (3'-dimethylaminopropyl)piperazine in propanol gives an oil which is converted into the dihydrochloride upon treatment with ethereal hydrogen chloride. Recrystallization from methanol gives crystals of 2' - (p-chlorophenoxy) - 4 - (3'-dimethylaminopropyl)-1-piperazinethiocarboxanilide dihydrochloride, melting point 208–210° C.

By the procedure of Example 1, treatment of 2'-(p-chlorophenoxy) - 4 - (3-dimethylaminopropyl)-1-piperazinethiocarboxanilide with polyphosphoric acid at 120–140° C. for three hours gives the product, melting point 212–215° C.

EXAMPLE 11

Preparation of 2 - chloro-10,11-dihydrodibenz[b,f][1,4] oxazepine-11-thione

Using the procedure described in Example 2, and treating phenyl 2-(p-chlorophenoxy)thiocarbanilate with 1-methylpiperazine gives crystals of 2'-(p-chlorophenoxy)-4-methyl - 1 - piperazinethiocarboxanilide, melting point 145–147° C., after recrystallization from acetone-hexane.

By the procedure of Example 1, treatment of 2'-(p-chlorophenoxy) - 4 - methyl-1-piperazinethiocarboxanilide with polyphosphoric acid at 130° for three hours gives the product 2 - chloro-10,11-dihydrodibenz[b,f][1,4]oxazepine - 11 - thione as yellow crystals, melting point 211–214° C., after recrystallization from ether-hexane.

EXAMPLE 12

Preparation of 2 - chloro-10,11-dihydrodibenz[b,f][1,4] oxazepine-11-thione

A solution of 15.1 g. of 2-(p-chlorophenoxy)aniline and 5.95 g. of phenoxythiocarbonyl chloride in 150 ml. of ether is stirred at room temperature for 16 hours. The resulting mixture is filtered, and the ethereal filtrate was evaporated to give phenyl 2-(p-chlorophenoxy)thiocarbanilate, which is recrystallized from ethanol-heptane to give crystals, melting point 70–71° C.

In the manner described in Example 1, treatment of phenyl 2-(p-chlorophenoxy)thiocarbanilate, prepared as described above with polyphosphoric acid at 100° C. for one hour gives the product 2-chloro-10,11-dihydrodibenz[b,f][1,4]oxazepine-11-thione as yellow crystals, melting point 212°–215° C.

EXAMPLE 13

Preparation of 10,11-dihydrodibenz[b,f][1,4]thiazepine-11-thione

A solution of 2.0 g. of 2-(phenylthio)aniline and 860 mg. of phenoxythiocarbonyl cloride in ether is stirred at room temperature for 16 hours. The mixture is filtered, and the ethereal filtrate is evaporated to give phenyl 2-(phenylthio)carbanilate, which is recrystallized from ethanol to give crystals, melting point 86–88° C.

In the manner described in Example 1, treatment of phenyl 2-(phenylthio)carbanilate, prepared as described above, with polyphosphoric acid at 100° C. for one hour gives the product 10,11 - dihydrodibenz[b,f][1,4]thiazepine-11-thione as yellow crystals.

What is claimed is:

1. A method of preparing dibenz heterocyclic thiones of the formula:

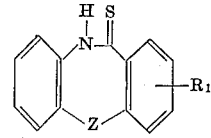

wherein $R_1$ is selected from the group consisting of hydrogen and halogen and Z is selected from the group consisting of oxygen, sulfur, methylene and >N-lower alkyl, which comprises heating a compound of the formula:

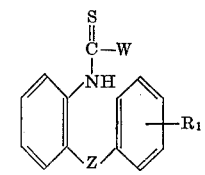

wherein $R_1$ and Z are as described above, and W is selected from the group consisting of phenoxy, dilower alkyl amino, N - lower alkylpiperazino, N - (ω - hydroxy lower alkyl)piperazino, N - [(ω - dilower alkylamino)lower alkyl]piperazino, morpholino, cyclopolymethyleneimino of 4 to 6 carbon atoms with polyphosphoric acid at a temperature of from about 70° C. to 200° C. for a period of form about 15 minutes to about 24 hours and recovering said compound therefrom.

2. A method of preparing dibenz heterocyclic thiones according to claim 1, wherein the reaction is carried out at a temperature of from about 70 to 200° C. for a period of from 15 minutes to 24 hours.

3. A method of preparing dibenz heterocyclic thiones according to claim 1, in which the starting material is 2' - benzyl - 4 - methyl-1-piperazinethiocarboxanilide and the product obtained is 5,6 - dihydromorphanthridine-6-thione.

4. A method of preparing dibenz heterocyclic thiones according to claim 1, in which the starting material is 2' - phenoxy - 4 - methyl-1-piperazinethiocarboxanilide and the product obtained is 10,11 - dihydrodibenzed[b,f][1,4]oxazepine-11-thione.

5. A method of preparing dibenz heterocyclic thiones according to claim 1, in which the starting material is 2' - (p - chlorophenylthio) - 4-methyl-1-piperazinethiocarboxanilide hydrochloride and the product obtained is 2 - chloro - 10,11 - dihydrodibenz[b,f][1,4]thiazepine-11-thione.

6. A method of preparing dibenz heterocyclic thiones according to claim 1, in which the starting material is phenyl 2 - benzylthiocarbanilate and the product obtained is 5,6-dihydromorphanthridine-6-thione.

7. A method of preparing dibenz heterocyclic thiones according to claim 1, in which the starting material is 2' - phenoxy - 1 - piperidinethiocarboxanilide and the product obtained is 10,11 - dihydrodibenz[b,f][1,4]oxazepine-11-thione.

8. A method of preparing dibenz heterocyclic thiones according to claim 1, in which the starting material is 2' - (p - chlorophenoxy) - 4-methyl-1-piperazinethiocarboxanilide and the product obtained is 2 - chloro - 10,11-dihydrodibenz[b,f][1,4]oxazepine-11-thione.

9. A method of preparing dibenz heterocyclic thiones according to claim 1, in which the starting material is phenyl 2 - (p - chlorophenoxy)thiocarbanilate and the product obtained is 2 - chloro - 10,11 - dihydrodibenz[b,f][1,4]oxazepine-11-thione.

10. A method of preparing dibenz heterocyclic thiones according to claim 1, in which the starting material is phenyl 2 - (phenylthio)carbanilate and the product obtained is 10,11 - dihydrodibenz[b,f][1,4]thiazepine-11-thione.

References Cited
UNITED STATES PATENTS
3,459,737   8/1969   Schmidt et al. _____ 260—239.3

HENRY R. JILES, Primary Examiner

R. T. BOND, Assistant Examiner

U S. Cl. X.R.

260—333, 327, 239, 268, 247.5, 293, 326.85, 999